United States Patent [19]

Ott et al.

[11] Patent Number: 5,374,340
[45] Date of Patent: Dec. 20, 1994

[54] PROCESS FOR COATING ELECTRICALLY CONDUCTING SUBSTRATES, SUBSTRATES COATED BY THIS PROCESS AND AQUEOUS ELECTROCOATING BATHS

[75] Inventors: Günther Ott, Münster; Udo Reiter, Telgte; Walter Jouck, Münster; David J. Santure, Münster; Dieter Rühl, Münster, all of Germany

[73] Assignee: BASF Lacke + Farben AG, Münster, Germany

[21] Appl. No.: 127,102

[22] Filed: Sep. 24, 1993

Related U.S. Application Data

[63] Continuation of Ser. No. 548,997, Sep. 18, 1990, abandoned.

[30] Foreign Application Priority Data

Jan. 22, 1988 [DE] Germany ............................. 3801787

[51] Int. Cl.$^5$ .............................................. C25D 13/04
[52] U.S. Cl. ............................. 204/181.7; 204/181.4; 523/415; 523/417; 524/901
[58] Field of Search ..................... 204/181.7, 181.4; 523/415, 417; 524/901

[56] References Cited

U.S. PATENT DOCUMENTS 3,975,250  8/1976  Marchetti et al. ............... 204/181.7
4,423,166 12/1983  Moriarity et al. ................ 204/181.7

*Primary Examiner*—John Niebing
*Assistant Examiner*—Kishor Mayekar
*Attorney, Agent, or Firm*—Kenyon & Kenyon

[57] ABSTRACT

The invention relates to a process for a cathodic electrocoating process, wherein the electrocoating bath contains at least 7.5% by weight of a polyoxyalkylenepolyamine or a mixture consisting of several polyoxyalkylenepolyamines of different chemical structures, the percentage by weight referring to the total amount of binders contained in the electrocoating bath.

10 Claims, No Drawings

PROCESS FOR COATING ELECTRICALLY CONDUCTING SUBSTRATES, SUBSTRATES COATED BY THIS PROCESS AND AQUEOUS ELECTROCOATING BATHS

This application is a continuation of application Ser. No. 07/548,997, filed on Sep. 18, 1990 now abandoned.

The invention relates to a process for coating electrically conducting substrates, in which process
(1) the substrate is immersed in an aqueous electrocoating bath which contains a resin capable of being cathodically deposited,
(2) the substrate is connected as cathode,
(3) a film is deposited on the substrate by the action of direct current,
(4) the substrate is removed from the electrocoating bath and
(5) the deposited paint film is baked.

The invention also relates to substrates coated by the process according to the invention and to the electrocoating baths employed in the process according to the invention.

The cathodic electrocoating process described above is a painting process frequently used primarily for priming, in particular for priming of automotive bodies.

Processes of the type described above have been disclosed, for example, in the following patents: DE-OS 3,518,732, DE-OS 3,518,770, DE-OS 3,409,188, EP-A 4,090 and EP-A 12,463.

Using processes of this type, it is possible to achieve coatings of excellent quality. However, surface defects (particularly craters), well known to a person skilled in the art, often occur in the baked paint film.

Many attempts have been made to suppress the occurrence of surface defects by adding additives. It is true that the surface defects may be eliminated in this manner, but, instead, problems due to adhesion failure usually appear in the overcoated paint films (for example filler and top coat). Problems of this sort occur especially in overcoated paint films containing alkyd resins as binders.

The object forming the basis of the present invention is to make available a novel process in accordance with the preamble to patent claim 1. The novel process should overcome or reduce, in particular, the problems outlined above, associated with the present state of the art.

Surprisingly, this object is achieved by a process in accordance with the preamble of patent claim 1, wherein the electrocoating bath contains at least 7.5% by weight of a polyoxyalkylenepolyamine or of a mixture consisting of several polyoxyalkylenepolyamines of different chemical structures, the percentage by weight referring to the total amount of binders contained in the electrocoating bath.

The advantages achieved by the invention are essentially to be found in the fact that it is possible, using the process according to the invention, to obtain paint films which, compared with the paint films of the present state of the art, exhibit fewer and/or more faintly pronounced surface defects and do not give rise to defects due to adhesion failure in overcoated paint films, especially in overcoated paint films containing alkyd resins as binders.

Further important advantages achieved by the process according to the invention lie in the fact that, compared with the present state of the art, the paint films obtained by the process according to the invention possess greater film thicknesses and greater flexibility.

U.S. Pat. No. 3,975,250 discloses cationic reactive plasticizers, suitable for use in electrocoating baths, which are prepared by the reaction of partly blocked polyisocyanates with polyoxypropylenediamines. However, an average person skilled in the art, faced with the object forming the basis of the present invention, is unable to infer from U.S. Pat. No. 3,975,250 any information for achieving the object.

U.S. Pat. No. 4,423,166 discloses an electrocoating process in accordance with the preamble to patent claim 1, wherein the electrocoating bath contains as anticratering agent an adduct of a polyoxyalkylenepolyamine and a polyepoxide. It is true that the paint films obtained by the process disclosed in U.S. Pat. No. 4,423,166 exhibit a lower tendency for surface defect formation, but they give rise to defects due to adhesion failure in the overcoated paint films. Such defects occur especially in overcoated paint films containing alkyd resins as binders.

The advantages achieved by the present invention are all the more surprising, since U.S. Pat. No. 4,423,166, column 18, describes electrocoating baths which contain up to 7.0% by weight, based on the total amount of binders contained in the electrocoating bath, of a polyoxyalkylenepolyamine, adduct but produce paint films with pronounced surface defects (cf . Table I in U.S. Pat. No. 4,423,166).

Electrocoating baths for cathodic electrocoating are preferably prepared by first preparing an aqueous dispersion which contains a resin capable of being cathodically deposited and, if appropriate, a crosslinking agent and other customary additives such as, for example, antifoams etc.

A pigment paste is then incorporated in this aqueous dispersion.

The pigment paste consists of a ground resin and pigments and/or fillers. In addition, the pigment paste may also contain other additives such as, for example, plasticizers, wetting agents, antioxidants etc.

Examples of pigments and fillers which may be contained in the pigment paste, are: titanium dioxide, antimony oxide, zinc oxide, basic lead carbonate, basic lead sulfate, barium carbonate, porcelain, clay, calcium carbonate, aluminum silicate, silicon dioxide, magnesium carbonate, magnesium silicate, cadmium yellow, cadmium red, carbon black, phthalocyanine blue, chromium yellow, toluidyl red and hydrated iron oxide.

The preparation of pigment pastes is generally known and need not be explained here in greater detail (cf., for example, D. H. Parker, Principles of Surface Coating Technology, Interscience Publishers, New York (1965); R. L. Yates, Electropainting, Robert Draper Ltd., Teddington/England (1966); H. F. Payne, Organic Coating Technology, volume 2, Wiley and Sons, New York (1961)).

The pigment paste is added to the aqueous dispersion described above in such an amount that the finished electrocoating bath possesses the characteristics required for the deposition. In most cases the weight ratio of pigment or filler to the total amount of resin capable of being cathodically deposited and contained in the electrocoating bath is 0.05 to 0.5.

After the aqueous dispersion and the pigment paste have been combined and the combination adjusted to a suitable solids content, an electrocoating bath ready-for-use is obtained.

The electrocoating baths used according to the invention may in principle contain all the non-self-crosslinking or self-crosslinking resins capable of being cathodically deposited which are suitable for the preparation of electrocoating baths. The electrocoating baths used according to the invention may also contain mixtures of different resins capable of being cathodically deposited.

However, electrocoating baths containing cationic amine-modified epoxy resins as the resins capable of being cathodically deposited are preferred. Self-crosslinking as well as non-self-crosslinking cationic amine-modified epoxy resins are known. Non-self-crosslinking cationic amine-modified epoxy resins are preferably used.

Cationic amine-modified epoxy resins are understood to be cationic reaction products from (A) optionally modified polyepoxides and
(B) amines.

Polyepoxides are understood to be compounds which contain two or more epoxide groups in the molecule.

Particularly preferred components (A) are compounds which may be prepared by reacting (a) a diepoxide compound or a mixture of diepoxide compounds of an epoxide equivalent weight below 2000 with
(b) a compound monofunctionally reactive toward epoxide groups under the given reaction conditions and containing a phenol or thiol group, or a mixture of such compounds, the components (a) and (b) being used in a molar ratio of 10:1 to 1:1, preferably 4:1 to 1.5:1, and the reaction of the component (a) with the component (b) being carried out at 100° to 190° C. in the presence or absence of a catalyst (cf. DE-OS 3,518,770).

Other particularly preferred components (A) are compounds which may be prepared by a polyaddition of a diepoxide compound and/or a mixture of diepoxide compounds, if desired in conjunction with at least one monoepoxide compound, to an epoxy resin in which the diepoxide compound and initiator are incorporated in a molar ratio greater than 2:1 to 10:1, the said polyaddition being carried out at 100° to 195° C. in the presence of absence of a catalyst and initiated by a monofunctionally reactive initiator carrying either an alcoholic OH group or a phenolic OH group or an SH group (cf. DE-OS-3,518,732).

The polyepoxides which may be used for the preparation of the particularly preferred components (A) and may even themselves be used as the components (A), are polyglycidyl ethers of polyphenols prepared from polyphenols and epihalohydrins. The use of bisphenol A and bisphenol F, for example, as the polyphenols is particularly preferred. In addition, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene and phenolic novolak resins are also suitable.

Other suitable polyepoxides are polyglycidyl ethers of polyhydric alcohols, such as, for example, ethylene glycol, diethylene glycol, triethylene glycol, 1,2-propylene glycol, 1,4-propylene glycol, 1,5-pentanediol, 1,2,6-hexanetriol, glycerol and bis(4-hydroxycyclohexyl)-2,2-propane.

Polyglycidyl esters of polycarboxylic acids, such as, for example, oxalic acid, succinic acid, glutaric acid, terephthalic acid, 2,6-naphthalenedicarboxylic acid and dimerized linoleic acid may be also used. Glycidyl adipate and glycidyl phthalate are typical examples.

Other suitable compounds are hydantoin epoxides, epoxidized polybutadiene and polyepoxide compounds which are obtained by epoxidation of an olefinically unsaturated aliphatic compound.

Modified polyepoxides are understood to be polyepoxides in which some of the reactive groups have been reacted with a modifying compound.

Examples of modifying compounds are:

a) compounds containing carboxyl groups such as saturated or unsaturated monocarboxylic acids (for example benzoic acid, linseed fatty acid, 2-ethylhexanoic acid, versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid, dimethylolpropionic acid) as well as polyesters containing carboxyl groups, or b) compounds containing amino groups, such as diethylamine or ethylhexylamine or diamines with secondary amino groups, for example N,N'-dialkylalkylenediamines such as dimethylethylenediamine, N,N'-dialkylpolyoxyalkyleneamines such as N,N'-dimethylpolyoxypropylenediamine, cyanoalkylated alkylenediamines such as bis-N,N'-cyanoethylethylenediamine, cyanoalkylated polyoxyalkylene amines such as bis-N,N'-cyanoethylpolyoxypropylenediamine, polyaminoamides such as, for example, versamides, in particular reaction products containing terminal amino groups, obtained from diamines (for example hexamethylenediamine), polycarboxylic acids, particularly dimeric fatty acids, and monocarboxylic acids, in particular fatty acids, or the reaction product of one mole of diaminohexane with two moles of a monoglycidyl ether or monoglycidyl ester, especially glycidyl esters of α-branched fatty acids such as versatic acid, or c) compounds containing hydroxyl groups such as neopentylglycol, bis-ethoxylated neopentylglycol, neopentyl glycol hydroxypivalate, dimethylhydantoin-N,N'-diethanol, hexane-1,6-diol, hexane-2,5-diol, 1,4-bis(hydroxymethyl)cyclohexane, 1,1-isopropylidene-bis(p-phenoxy)-2-propanol, trimethylolpropane, pentaerythritol or amino alcohols such as triethanolamine, methyldiethanoamine or alkylketimines containing hydroxyl groups, such as aminomethylpropanediol-1,3-methylisobutylketimine or tris(hydroxymethyl)aminomethanecyclohexanoneketimine, as well as polyglycol ethers, polyester polyots, polyether polyols, polycaprolactone polyols, polycaprolactam polyols of various functionalities and molecular weights, or d) saturated or unsaturated fatty acid methyl esters which are transesterified with the hydroxyl groups of the epoxy resins in the presence of sodium methylate.

Primary or secondary amines and their salts, salts of tertiary amines or mixtures of these compounds may be used as the component (B).

Water-soluble amines are preferably used as the component (B). Examples of suitable amines are monoalkylamines and dialkylamines, such as methylamine, ethylamine, propylamine, butylamine, dimethylamine, diethylamine, dipropyl-amine, methylbutylamine etc. Alkanolamines, such as, for example, methylethanolamine and diethanolamine may also be used as components (B). Kerimines of polyamines with primary and secondary amino groups may also be used as the component (B). Furthermore, dialkylaminoalkylamines, such as, for example, dimethylaminoethylamine, diethylaminopropylamine and dimethylaminopropylamine, are also suitable as the component (B).

Low-molecular amines are used in most cases as the components (B). It is also possible, however, to use higher-molecular monoamines.

Secondary amines are preferably used as the components

In many cases several different amines are used as the component (B).

The positive charges required for water dilutability and capacity to be electrically deposited may be imparted by protonation with water-soluble acids (for example boric acid, formic acid, lactic acid and, preferably, acetic acid) and/or by the use of amine salts as the components (B) in the binder molecule.

The cationic amine-modified epoxy resins used according to the invention are essentially free from epoxide groups, i.e. their epoxide group content is so low that crosslinking reactions via the epoxide groups cannot take place either before or after the deposition of the paint film. The cationic amine-modified epoxy resins used according to the invention preferably do not contain any free epoxide groups.

The cationic amine-modified epoxy resins may be used both as non-self-crosslinking resins and as self-crosslinking resins. Self-crosslinking cationic amine-modified epoxy resins may be obtained, for example, by chemical modification of the cationic amine-modified epoxy resins. A self-crosslinking cationic amine-modified epoxy resin may be obtained, for example, by reacting the cationic amine-modified epoxy resin with a partly blocked polyisocyanate which has on average one free isocyanate group per molecule and whose blocked isocyanate groups lose their blocking groups only at elevated temperatures.

Preferred electrocoating baths are obtained when non-self-crosslinking cationic amine-modified epoxy resins are used as resins capable of being cathodically deposited in combination with a suitable crosslinking agent.

Examples of suitable crosslinking agents are phenoplasts, polyfunctional Mannich bases, melamine resins, benzoguanamine resins, blocked polyisocyanates and compounds containing at least two groups of the general formula $R^1$—O—CO—.

The radical $R^1$ denotes:
$R^1 = R^2O$—CO—$CH_2$—, $R^3$—CHOH—$CH_2$—, $R^4$—CHOR$^5$—CHOH—$CH_2$—
$R^2$ = alkyl
$R^3$ = H, alkyl, $R^6$—O—$CH_2$— or $R^6$—CO—O—$CH_2$—
$R^4$ = H or alkyl
$R^5$ = H, alkyl or aryl
$R^6$ = alkyl, cycloalkyl or aryl Preferred electrocoating baths are obtained when blocked polyisocyanates and/or compounds containing at least two groups of the general formula $R^1$—O—CO— are used as crosslinking agents.

Any polyisocyanates in which the isocyanate groups have been reacted with a compound in such a way that the blocked polyisocyanate formed is non-reactive toward hydroxyl and amino groups at room temperature, but becomes reactive at elevated temperatures, usually in the range from about 90° C. to about 300° C., may be used as the blocked polyisocyanates. Any organic polyisocyanates suitable for the crosslinking may be used for the preparation of the blocked polyisocyanates. Isocyanates containing about 3 to 36, in particular about 8 to about 15 carbon atoms, are preferred. Examples of suitable diisocyanates are hexamethylenediisocyanate, 2,4-toluylenediisocyanate, 2,6-toluylenediisocyanate and 1-isocyanatomethyl-5-isocyanato-1,3,3-trimethylcyclohexane. However, it is also possible to employ polyisocyanates of higher isocyanate functionality. Corresponding examples are trimerized hexamethylenediisocyanate and trimerized isophoronediisocyanate. In addition, mixtures of polyisocyanates may also be used. The organic polyisocyanates which are suitable as crosslinking agents for the invention may also be prepolymers derived, for example, from a polyol including a polyether polyol or a polyester polyol.

Any suitable aliphatic, cycloaliphatic or aromatic alkylmonoalcohols may be used for the blocking of the polyisocyanates. Examples of these are aliphatic alcohols, such as methyl, ethyl, chloroethyl, propyl, butyl, amyl, hexyl, heptyl, octyl, nonyl, 3,3,5-trimethylhexyl, decyl and lauryl alcohol; cycloaliphatic alcohols such as cyclopentanol and cyclohexanol; aromatic alkylalcohols such as phenylcarbinol and methylphenylcarbinol.

Other suitable blocking agents are hydroxylamines such as ethanolamine, oximes such as methyl ethyl ketonoxime, acetone oxime and cyclohexanone oxime or amines such as dibutylamine and diisopropylamine. The above polyisacyanates and blocking agents may also be used, in suitable proportions, for the preparation of the partly blocked polyisocyanates referred to above.

Examples of compounds which contain at least two groups of the general formula $R^1$—O—CO—, are bis(carbalkoxymethyl) azelate, bis(carbalkoxymethyl) sebacate, bis(carbalkoxymethyl) adipate, bis(carbalkoxymethyl) decanate, bis(carbalkoxymethyl) terephthalate, bis(2-hydroxybutyl) acelate (sic) and bis(2-hydroxyethyl) terephthalate.

The crosslinking agent is usually used in an amount from 5 to 60% by weight, preferably 20 to 40% by weight, based on the total amount of crosslinkable resin capable of being cathodically deposited contained in the electrocoating bath.

It is an essential part of the invention that in the process according to the invention electrocoating baths are employed which contain at least 7.5% by weight of a polyoxyalkylenepolyamine or a mixture of several polyoxyalkylenepolyamines of different chemical structures, the percentage by weight referring to the total amount of binders contained in the electrocoating bath.

The polyoxyalkylenepolyamines are understood to be compounds which contain both oxyalkylene groups as well as at least two amino groups, preferably at least two primary amino groups. The polyoxyalkylenepolyamines should have a number average molecular weight of about 137 to 3600, preferably 400 to 3000, particularly preferably 800 to 2500. Furthermore, the polyoxyalkylenepolyamines should have an amine equivalent weight of about 69 to about 1800, preferably 200 to 1500, particularly preferably 400 to 1250.

The polyoxyalkylenepolyamines preferably used have a chemical structure according to the general formula (I)

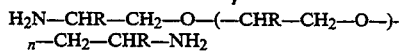

$$H_2N-CHR-CH_2-O-(-CHR-CH_2-O-)_n-CH_2-CHR-NH_2 \quad (I)$$

in which

R denotes H or an alkyl radical of 1 to 6 carbon atoms, preferably —$CH_3$ n denotes 5–60, preferably 20–40.

Polyoxyalkylenepolyamines which have a chemical structure in accordance with the general formula (I), are disclosed in U.S. Pat. No. 3,236,895, column 2, lines 40–72. The processes for the preparation of these polyoxyalkylenepolyamines are disclosed in the patent examples 4, 5, 6 and 8 to 12 found in columns 4 to 9 of U.S. Pat. No. 3,236,895.

It is also possible to employ polyoxyalkylenepolyamines which contain different oxyalkylene groups, for example polyoxyalkylene polyamines which have a chemical structure in accordance with the general formula (II):

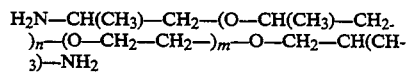

$$H_2N-CH(CH_3)-CH_2-(O-CH(CH_3)-CH_2-)_n-(O-CH_2-CH_2-)_m-O-CH_2-CH(CH_3)-NH_2 \quad (II)$$

in which n+m denotes 5 to 60, preferably 20 to 40 m denotes 1 to 59, preferably 5 to 30 n denotes 1 to 59, preferably 5 to 30.

It is also possible to use polyoxyalkylenepolyamine derivatives which are obtainable by the reaction of the polyoxyalkylenepolyamines described in U.S. Pat. No. 3,236,895, column 2, lines 40–72, with acrylonitrile, followed by hydrogenation of the reaction product.

These derivatives have a chemical structure in accordance with the general structural formula (III):

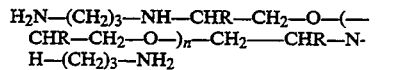

$$H_2N-(CH_2)_3-NH-CHR-CH_2-O-(-CHR-CH_2-O-)_n-CH_2-CHR-NH-(CH_2)_3-NH_2 \quad (III)$$

in which

R denotes H or an alkyl radical of 1 to 6 carbon atoms, preferably —$CH_3$ n denotes 5 to 60, preferably 20 to 40.

It goes without saying that the electrocoating baths used according to the invention may also contain a mixture of several polyoxyalkylenepolyamines of different chemical structures.

The polyoxyalkylenepolyamines or the polyoxyalkylenepolyamine mixtures may be incorporated in the electrocoating baths at any time during the preparation and even to the finished electrocoating baths. The polyoxyalkylenepolyamines or the polyoxyalkylenepolyamine mixtures are preferably added either to the aqueous dispersion or a precursor of the aqueous dispersion which contains a resin capable of being cathodically deposited and, optionally, a crosslinking agent and other customary additives such as, for example, antifoams etc. (cf. page 4, lines 19 ff), or to the pigment paste or a precursor of the pigment paste (cf. page 4, lines 26 ff).

The polyoxyalkylenepolyamine molecules are in all probability protonized by the acid contained in the aqueous dispersion or the pigment paste.

However, it is also possible to add the corresponding polyoxyalkylenepolyamine or polyoxyalkylenepolyamine mixture in the protonized form to the aqueous dispersion under discussion or a precursor of this dispersion, or to the pigment paste or a precursor of the pigment paste. The protonized polyoxyalkylenepolyamine or polyoxyalkylenepolyamine mixture may be obtained by the simple addition of a Brönsted acid to the corresponding polyoxyalkylenepolyamine or polyoxyalkylenepolyamine mixture. The total amount of Brönsted acid contained in the finished electrocoating bath should be selected in such a manner that the pH of the electrocoating bath is between 4 and 8, preferably between 5 and 7.5.

It is an essential part of the invention that the amount of polyoxyalkylenepolyamine or polyoxyalkylenepolyamine mixture contained in the electrocoating baths used according to the invention is at least 7.5% by weight, the percentage by weight referring to the total amount of binders contained in the electrocoating bath. This means in other words that the electrocoating baths used according to the invention must contain at least 7.5 parts by weight of polyoxyalkylenepolyamine or polyoxyalkylenepolyamine mixture per 100 parts by weight of binder. When electrocoating baths with a lower content of polyoxyalkylenepolyamine or polyoxyalkylenepolyamine mixture are used, the resultant paint films exhibit considerably more and/or considerably more strongly pronounced surface defects than when the electrocoating baths according to the invention are used.

The upper limit of the amount of polyoxyalkylenepolyamine or polyoxyalkylenepolyamine mixture contained in the electrocoating baths used according to the invention is determined by the plasticizing effect of the added polyoxyalkylenepolyamine or polyoxyalkylenepolyamine mixture and is generally from 20 to 40% by weight, the percentage by weight referring to the total amount of binders contained in the electrocoating bath.

The electrocoating baths used according to the invention preferably contain 8 to 18, particularly preferably 10 to 15% by weight of polyoxyalkylenepolyamine or polyoxyalkylenepolyamine mixture, the percentage by weight referring to the total amount of binders contained in the electrocoating bath.

The total amount of binders contained in the electrocoating bath is determined by adding the amount of resin capable of being cathodically deposited contained in the electrocoating bath, the amount of crosslinking agents optionally contained in the electrocoating bath, the amount of ground resin contained in the electrocoating bath and the amount of resins which crosslink under the baking conditions which may or may not be additionally present in the electrocoating bath.

The solids content of the electrocoating baths used according to the invention is preferably 7 to 35 parts by weight, particularly preferably 12 to 25 parts by weight.

The electrocoating bath is brought into contact with an electrically conducting anode and with the electrically conducting substrate connected as cathode. When electric current passes between the anode and the cathode, a highly adherant paint film is deposited on the cathode.

The temperature of the electrocoating bath should be between 15° and 35° C., preferably between 20° and 30° C.

The applied voltage may fluctuate within a wide range and may be, for example, between two and one thousand volt. However, typical operational voltages are between 50 and 500 volt. The current density is usually between about 10 and 100 ampere/m². The current density tends to drop in the course of the deposition.

When the deposition is completed, the coated object is rinsed and is then ready for baking.

The deposited paint films are generally baked at temperatures from 130° to 200° C. during a period of 10 to 60 minutes, preferably at 150° to 180° C. during a period from 15 to 30 minutes.

The process according to the invention may be employed for coating of any electrically conducting substrate, in particular, however, for coating of metals such as steel, aluminum, copper and the like.

The invention is explained in greater detail in the examples below. All parts and percentages are parts and percentages by weight, unless expressly stated otherwise.

1. Preparation of Aqueous Dispersions Containing a Resin Capable of Being Cathodically Deposited and a Crosslinking Agent

1.1 Preparation of an Amine-Modified Epoxy Resin 1780 g of Epikote 1001[1], 280 g of dodecylphenol and 105 g of xylene are placed in a reaction vessel and molten at 120° C. in an atmosphere of nitrogen.

[1] An epoxy resin from Shell with an epoxide equivalent weight of 500.

Traces of water are subsequently removed in a slight vacuum. 3 g of N,N-dimethylbenzylamine are then added, the reaction mixture is heated to 130° C. and kept at this temperature for about 3 h until the epoxide equivalent weight (EEW) has risen to 1162. The mixture is then cooled and 131 g of hexylglycol, 131 g of diethanolamine and 241 g of xylene are then added in rapid succession. This causes a slight temperature rise. The reaction mixture is then cooled to 90° C. and further diluted by the addition of 183 g of butylglycol and 293 g of isobutanol. When the temperature has dropped to 70° C., 41 g of N,N-dimethylaminopropylamine are added, the temperature is kept for 3 h and the mixture is then discharged.

The resin has a solids content of 70.2% and a base content of 0.97 milliequivalents/gram.

1.2 Preparation of a Crosslinking Agent 1.129 g of toluylene diisocyanate (commercial mixture of isomers consisting of the 2,4 and 2,6 isomers) and 490 g of methyl isobutyl ketone are placed in a reaction vessel in an atmosphere of nitrogen. 0.6 g of dibutyltin dilaurate and then, in small portions, 290 g of trimethylolpropane are added with stirring in such a manner that with external cooling the internal temperature does not exceed 50° C. (duration about 2 h). The reaction mixture is further stirred, while cooling, until the NCO equivalent weight has reached a value of 215. 675 g of ethylene glycol monopropyl ether are then added dropwise at such a rate that the internal temperature does not exceed 100° C. The temperature is then kept at 100° C. for 1 h, the mixture is diluted with 362 g of methyl isobutyl ketone and 10 g of n-butanol, and after brief cooling the mixture is discharged. The resin has a solids content of 71.8% (1 h at 130° C.) and a viscosity of 1.5 dPas (50% solution in methyl isobutyl ketone, measured in a plate-cone viscometer).

1.3 Preparation of the Aqueous Dispersions

1.3.1 Dispersion (I)

915 g of resin according to procedure 1.1, 493 g of crosslinking agent according to procedure 1.2 and 134 g of a polyoxypropylenediamine of the formula $$H_2N-CH(CH_3)-CH_2-(-OCH_2-CH(CH_3))_x--NH_2$$

$x = 33.1$ (Jeffamine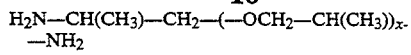R D 2000, commercial product from Texaco Chemical Company) are mixed at room temperature and stirred. As soon as the solution has become homogeneous, 2.2 g of an antifoam solution[1] and 22 g of glacial acetic acid are stirred in, and 674 g of deionized water are added in 6 portions. The mixture is then diluted with further 960 g of deionized water added in small portions.

[1] Surfynol (commercial product from Air Chemicals), strength solution in ethylene glycol monobutyl ether The resultant aqueous dispersion is freed from low-boiling solvents by vacuum distillation and subsequently diluted with deionized water to a solids content of 33%.

1.3.2 Dispersion (II)

The procedure 1.3.1 is followed, except that 67 g of polyoxypropylenediamine are used in place of 134 g of polyoxypropylenediamine.

1.3.3 Dispersion (III)

Procedure 1.3,1 is followed, except that no polyoxypropylenediamine is used. After vacuum distillation a correspondingly smaller amount of deionized water is added in order to adjust the solids content of 33%.

2. Preparation of a Pigment Paste

2.1 Preparation of a Ground Resin According to DE-OS 3,422,457

640 parts of a diglycidyl ether based on bisphenol A and epichlorohydrin with an epoxide equivalent weight of 485 and 160 parts of such diglycidyl ether with an epoxide equivalent weight of 189 are mixed at 100° C. 452 parts of hexamethylenediamine are placed in a further vessel, heated to 100° C. and treated with 720 parts of the above hot epoxy resin mixture in the course of one hour, gentle cooling being necessary in order to keep the temperature at 100° C. After a further period of 30 minutes the excess hexamethylenediamine is removed while increasing the temperature and reducing the pressure, a final temperature of 205° C. and a final pressure of 30 mbar being reached. 57.6 parts of stearic acid, 172.7 parts of dimeric fatty acid and 115 parts of xylene are then added. The water formed is then removed by azeotropic distillation at 175° to 180° C. in the course of 90 min. 58 parts of butylglycol and 322 parts of isobutanol are then added. The product has a solids content of 70% and a viscosity of 2240 mPas, measured at 75° C. in a plate-cone viscometer.

2.2 Preparation of the Pigment Paste 586 parts of the ground resin are thoroughly mixed with 1162 parts of deionized water and 22 parts of glacial acetic acid. The mixture is subsequently treated with 880 parts of TiO$_2$, 250 parts of an extender based on aluminum silicate, 53 parts of lead silicate and 10 parts of carbon black. This mixture is comminuted in a grinding unit to a Hegman fineness of less than 12 μm. Deionized water is then added in order to reach the required paste consistency.

3. Preparation of Electrocoating Baths and Deposited Coatings According to the Invention 700 parts of the pigment paste according to procedure 2.2 are added to 2200 parts by weight of the dispersions according to procedure 1.3, and the solids content of the bath is adjusted to 20% by weight using deionized water. The deposition of the paint films is carried out for 2 minutes at 300 V on phosphated metal sheet. The bath temperature is 27° C. The films are baked at 165° C. for 20 minutes.

- Electrocoating bath 1: Dispersion according to procedure 1.3.1 with paste according to procedure 2.2 Polyoxypropylenediamine content (based on the total amount of binders): 11.9% by weight
- Electrocoating bath 2: Dispersion according to procedure 1.3.2 with paste according to procedure 2.2 Polyoxypropylenediamine content (based on the total amount of binders): 6.0% by weight
- Electrocoating bath 3: Dispersion according to procedure 1.3.3 with paste according to procedure 2.2 Polyoxypropylenediamine content: 0% by weight Deposition Results

| Electrocoating bath | 1 | 2 | 3 |
|---|---|---|---|
| Film thickness (μm) | 27 | 20 | 16 |
| Flow-out[1] | 1.5 | 2.5 | 1.5 |
| Craters/dm$^2$ | 1 | 20 | 10 |

These films were then overcoated by a commercial aqueous fuller and a white alkyd topcoat, and tested in a condensed water static test for 240 h. The adhesion of the films was subsequently tested by the crosshatch test and the Tesa pull-off test.

| Electrocoating bath | 1 | 2 | 3 |
|---|---|---|---|
| Adhesion[1] | 0.5 | 0.5 | 0.5 |

[1]Rating 0-5 (good - poor)

We claim:

1. A process for coating electrically conducting substrates comprising the steps of:
   (1) immersing the substrate in an aqueous electrocoating bath containing a resin capable of being cathodically deposited,
   (2) connecting the substrate to a current source to act as a cathode,
   (3) depositing a film on the substrate by the action of direct current,
   (4) removing the substrate from the electrocoating bath, and
   (5) baking the deposited paint film,
wherein the electrocoating bath further contains at least 7.5% by weight of a polyoxyalkylenepolyamine, wherein the polyoxyalkylenepolyamine is selected from the group consisting of chemical structures having the formula:

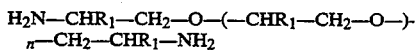

in which $R_1$ denotes H or an alkyl radical of 1 to 6 carbon atoms, and n denotes 5–60,

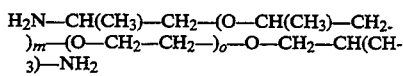

in which m+o denotes 5 to 60, m denotes 1 to 59, and o denotes 1 to 59, and

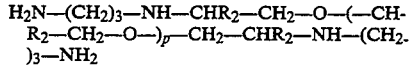

in which $R_2$ denotes H or an alkyl radical of 1 to 6 carbon atoms, and p denotes 5 to 60, the percentage by weight referring to the total amount of binder contained in the electrocoating bath.

2. The process as claimed in claim 1, wherein the resin capable of being cathodically deposited is a cationic amine-modified epoxy resin.

3. The process as claimed in claim 1, wherein the polyoxyalkylenepolyamine is

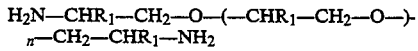

in which
$R_1$ denotes H or an alkyl radical of 1 to 6 carbon atoms, and
n denotes 5 to 60.

4. An aqueous electrocoating bath containing a binder resin capable of being cathodically deposited, wherein the said bath further contains at least 7.5% by weight of a polyoxyalklenepolyamine, wherein the polyoxyalkylenepolyamine is selected from the group consisting of chemical structures having the formula:

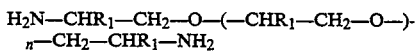

in which $R_1$ denotes H or an alkyl radical of 1 to 6 carbon atoms, and n denotes 5-60,

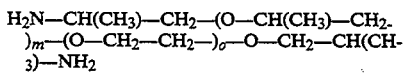

in which m+o denotes 5 to 60, m denotes 1 to 59, and o denotes 1 to 59, and

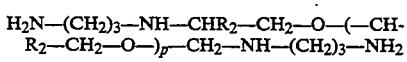

in which $R_2$ denotes H or an alkyl radical of 1 to 6 carbon atoms, and p denotes 5 to 60, the percentage by weight referring to the total amount of binder contained in the electrocoating bath.

5. The electrocoating bath as claimed in claim 4, wherein the resin capable of being cathodically deposited is a cationic amine-modified expoxy resin.

6. The electrocoating bath as claimed in claim 5 wherein the polyoxyalkylenepolyamine is

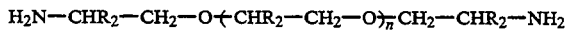

in which
$R_1$ denotes H or an alkyl radical of 1 to 6 carbon atoms, and
n denotes 5 to 60.

7. The process of claim 3 wherein $R_1$ is —$CH_3$.

8. The process of claim 3 wherein n is 20 to 40.

9. The electrocoating bath of claim 6 wherein $R_2$ is —$CH_3$.

10. The electrocoating bath of claim 6 wherein n is 20 to 40.

* * * * *

UNITED STATES PATENT AND TRADEMARK OFFICE
CERTIFICATE OF CORRECTION

PATENT NO. : 5,374,340
DATED : 20 December 1994
INVENTOR(S) : Günther OTT et al.

It is certified that error appears in the above-identified patent and that said Letters Patent is hereby corrected as shown below:

| Column | Line | |
|---|---|---|
| 4 | 48 | Change "methyldiethanoamine" to --methyldiethanolamine--. |
| 4 | 53 | Change "polyots" to --polyols--. |
| 4 | 67 | Change "dipropyl-amine" to --dipropylamine--. |
| 5 | 2 | Change "Kerimines" to --Ketimines--. |
| 5 | 12 | After "nents" insert --(B).--. |
| 5 | 15 | Change "dilutabitity" to --dilutability--. |
| 6 | 37 | Change "bis(-" to --bis(--. |

UNITED STATES PATENT AND TRADEMARK OFFICE
CERTIFICATE OF CORRECTION

PATENT NO. : 5,374,340
DATED : 20 December 1994
INVENTOR(S) : Günther OTT et al.

It is certified that error appears in the above-identified patent and that said Letters Patent is hereby corrected as shown below:

| Column | Line | |
|---|---|---|
| 12 | 41 | Change "$R_2-CH_2-O-)_p-CH_2-NH-(CH_2)_3-NH_2$" to --$R_2-CH_2-O-)_p-CH_2-CHR_2-NH-(CH_2)_3-NH_2$--. |
| 12 | 53 | Delete entire line and insert therefor: --$H_2N-CHR_2-CH_2-O-(-CHR_2-CH_2-O-)_n-CH_2-CHR_2-NH_2$--. |
| 12 | 56 | Change "$R_1$" to --$R_2$--. |

Signed and Sealed this

Fifth Day of November, 1996

Attest:

BRUCE LEHMAN

Attesting Officer    Commissioner of Patents and Trademarks